(12) United States Patent
Iizuka et al.

(10) Patent No.: US 10,969,479 B2
(45) Date of Patent: Apr. 6, 2021

(54) ESTIMATION DEVICE AND ESTIMATION METHOD

(71) Applicant: PANASONIC INTELLECTUAL PROPERTY MANAGEMENT CO., LTD., Osaka (JP)

(72) Inventors: Shoichi Iizuka, Osaka (JP); Takeshi Nakayama, Hyogo (JP); Naoki Honma, Iwate (JP); Dai Sasakawa, Iwate (JP); Yukio En, Miyagi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 321 days.

(21) Appl. No.: 16/240,919

(22) Filed: Jan. 7, 2019

(65) Prior Publication Data
US 2019/0212431 A1  Jul. 11, 2019

(30) Foreign Application Priority Data

Jan. 9, 2018  (JP) .............................. JP2018-001045
May 30, 2018 (JP) .............................. JP2018-104092
Aug. 29, 2018 (JP) .............................. JP2018-160851

(51) Int. Cl.
*G01S 13/48* (2006.01)
*G06F 3/01* (2006.01)
(Continued)

(52) U.S. Cl.
CPC .............. *G01S 13/48* (2013.01); *G01S 7/282* (2013.01); *G01S 7/292* (2013.01); *G01S 13/874* (2013.01);
(Continued)

(58) Field of Classification Search
CPC ........ G01S 13/874; G01S 7/292; G01S 7/282; G06F 3/011; G06F 3/017; G01V 3/12; G01V 3/38
See application file for complete search history.

(56) References Cited

U.S. PATENT DOCUMENTS 10,459,080 B1 * 10/2019 Schwesig .............. G06F 16/245
10,817,065 B1 * 10/2020 Lien ........................ G01S 7/412
(Continued)

FOREIGN PATENT DOCUMENTS

JP          11-006874         1/1999
JP          2014-207935       11/2014

*Primary Examiner* — Olumide Ajibade Akonai
(74) *Attorney, Agent, or Firm* — Greenblum & Bernstein, P.L.C.

(57) ABSTRACT

There is provided an estimation device that estimates a living body orientation. The estimation device includes: transceivers that transmit transmission signals using M transmission antenna elements arranged to surround a predetermined range including a living body, and receive reception signals using N receiving antenna elements; and a circuit that, for each of M sets of N reception signals corresponding to transmitted M transmission signals, performs calculation of a characteristic quantity based on the N reception signals included in the set, the characteristic quantity with a greater value indicating a waveform having a larger amplitude and higher regularity, identifies a first transmission antenna element corresponding to a first characteristic quantity having a greatest value among M characteristic quantities by comparing the M characteristic quantities obtained by the calculation with each other, and estimates the living body orientation to indicate a predetermined direction based on the first transmission antenna element identified.

7 Claims, 10 Drawing Sheets

(51) Int. Cl.
*G01S 7/292* (2006.01)
*G01S 7/282* (2006.01)
*G01S 13/87* (2006.01)
*G01S 7/41* (2006.01)
*G06K 9/00* (2006.01)

(52) U.S. Cl.
CPC .............. *G06F 3/011* (2013.01); *G01S 7/415* (2013.01); *G06F 3/017* (2013.01); *G06K 9/00355* (2013.01)

(56) References Cited

U.S. PATENT DOCUMENTS

2016/0041618 A1* 2/2016 Poupyrev ................ G06F 3/014
 342/61
2016/0054792 A1* 2/2016 Poupyrev ................ G06F 3/015
 345/156
2016/0320852 A1* 11/2016 Poupyrev ........... G06K 9/00355
2019/0208456 A1* 7/2019 Mofidi ...................... H04L 5/14

* cited by examiner

FIG. 11

| ANTENNA NUMBER | ORIENTATION WITH RESPECT TO LIVING BODY | CHARACTERISTIC QUANTITY |
|---|---|---|
| 1 | 0° | 0.79 |
| 2 | 45° | 0.88 |
| 3 | 90° | 0.15 |
| 4 | 135° | 0.01 |
| 5 | 180° | 0.01 |
| 6 | 225° | 0.01 |
| 7 | 270° | 0.01 |
| 8 | 315° | 0.1 |

US 10,969,479 B2

ESTIMATION DEVICE AND ESTIMATION METHOD

CROSS REFERENCE TO RELATED APPLICATION

This application claims the benefit of priority of Japanese Patent Application Number 2018-001045 filed on Jan. 9, 2018, Japanese Patent Application Number 2018-104092 filed on May 30, 2018, and Japanese Patent Application Number 2018-160851 filed on Aug. 29, 2018, the entire content of which is hereby incorporated by reference.

BACKGROUND

1. Technical Field

The present disclosure relates to an estimation device that estimates an orientation of a living body, and an estimation method. The estimation device estimates the orientation, in which the front side of a living body faces, by emitting a wireless signal to the living body and receiving a signal reflected by the living body.

2. Description of the Related Art

Japanese Unexamined Patent Application Publication No. 2014-207935 discloses a device that estimates whether a living body on a bed is face up or face down by emitting electromagnetic waves to the living body and detecting vibration of heartbeat and breathing included in the waves reflected by the living body.

In addition, Japanese Unexamined Patent Application Publication No. 11-6874 discloses a device that emits electromagnetic waves to a heap of rubble at a disaster relief site and detects a survivor from the waves reflected by the heap of rubble.

SUMMARY

However, using related art, it is not possible to estimate an orientation of a living body with a finer resolution.

In order to achieve the above-mentioned object, an estimation device according to the present disclosure is an estimation device that estimates a living body orientation indicating a direction in which a front side of a living body faces, the estimation device including: M transmitters that transmit M transmission signals to a predetermined range including the living body using M transmission antenna elements arranged to surround the predetermined range, M being an integer greater than or equal to three; N receivers which are arranged to surround the predetermined range, and receive N reception signals for a predetermined period using respective receiving antenna elements included in the N receivers, the receiving signals including signals in which the M transmission signals have been reflected, transmitted, or scattered by the living body, N being an integer greater than or equal to two; and a circuit. For each of M sets of the N reception signals corresponding to the M transmission signals transmitted by the M transmission antenna elements, the circuit performs calculation of a characteristic quantity based on the N reception signals included in the set, the characteristic quantity with a greater value indicating a waveform having a larger amplitude and higher regularity, identifies a first transmission antenna element corresponding to a first characteristic quantity having a greatest value among M characteristic quantities, each of which is the characteristic quantity obtained by the calculation, by comparing the M characteristic quantities with each other, and estimates the living body orientation to indicate a predetermined direction based on the first transmission antenna element identified.

It should be noted that general or specific embodiments may be implemented as a system, a method, an integrated circuit, a computer program, a recording medium such as a computer readable CD-ROM, or any selective combination thereof.

With the estimation device according to the present disclosure, in estimation of a living body orientation that is the direction in which the front side of a living body faces, it is possible to improve the resolution and accuracy of an estimated living body orientation.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 11 is a table illustrating an example of a result of calculation of a characteristic quantity from the absolute value of each of eight channel responses.

Figure 1:
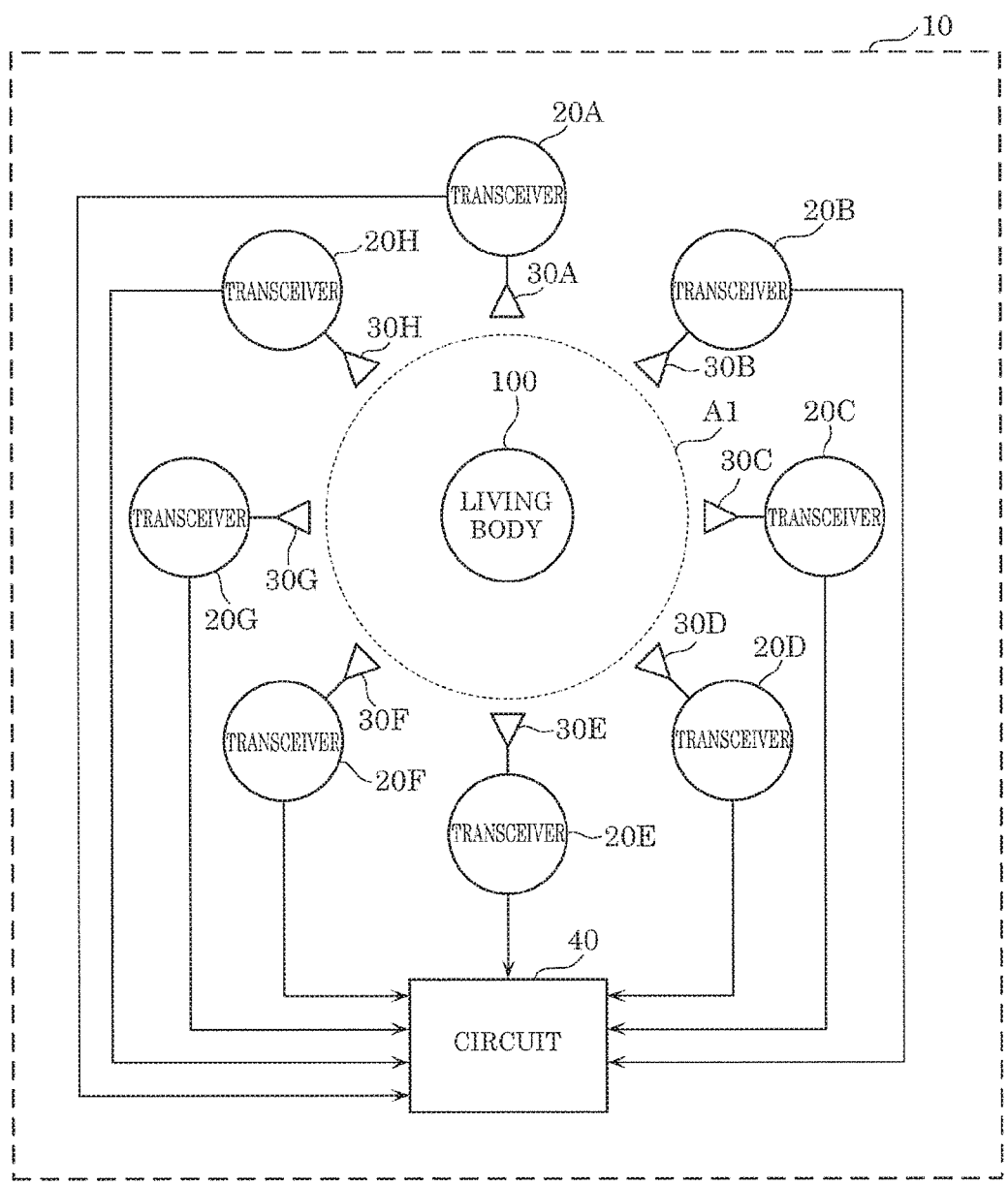
FIG. 1 is a configuration diagram illustrating an example of an estimation device in an embodiment.

DETAILED DESCRIPTION OF THE EMBODIMENT (Underlying Knowledge Forming Basis of Present Disclosure)

The inventors have conducted intensive study of related art for estimating a living body orientation utilizing electromagnetic waves. Japanese Unexamined Patent Application Publication No. 2014-207935 discloses a method in which when electromagnetic waves are emitted to a living body and the waves reflected by the living body are received, determination is made such that when the amount of change in received signal is greater than or equal to a threshold, the living body is face up, and when the amount of change in received signal is less than the threshold, the living body is face down. Although an approximate direction in which the front side of a living body faces may be estimated with this method, it is not possible to estimate fine direction change of the front side of the body, such as the change in direction of the front side of the body, associated with a bed leaving motion which is necessary in nursing care.

Also, Japanese Unexamined Patent Application Publication No. 11-6874 discloses knowledge that when electromagnetic waves are emitted to a living body, the waveform of a reflection wave from the front side of the body has a larger amplitude and higher regularity than the waveform of reflection from other sides of the body. However, Japanese Unexamined Patent Application Publication No. 11-6874 does not disclose a method of quantitatively measuring a large amplitude and regularity, in order to know the accurate direction in which the front side of a living body faces, a user needs to view an obtained reflection waveform and determine the accurate direction based on the user's experience.

As a result of intensive study by the inventors to cope with the above-mentioned problem, in order to improve the resolution and accuracy of a living body orientation estimated by an estimation device, the inventors thought it is important to capture more characteristics of the living body by not only transmitting a transmission signal in one direction and receiving a reflection wave as in Japanese Unexamined Patent Application Publication No. 2014-207935, but also installing multiple antennas around the living body, transmitting transmission signals in various directions, and receiving reflection waves, transmissive waves, or scattered waves in various directions. Also, the inventors thought it is important to use a characteristic quantity that enables quantitative evaluation of the characteristics of reflection waveform from the front side of a living body disclosed in Japanese Unexamined Patent Application Publication No. 11-6874, that is, the reflection waveform has a large amplitude and regularity.

As a consequence, the inventors have devised the following estimation device and estimation method.

Specifically, the estimation device according to the present disclosure is an estimation device that estimates a living body orientation indicating a direction in which a front side of a living body faces, the estimation device comprising: M transmitters that transmit M transmission signals to a predetermined range including the living body using M transmission antenna elements arranged to surround the predetermined range, M being an integer greater than or equal to three; N receivers which are arranged to surround the predetermined range, and receive N reception signals for a predetermined period using respective receiving antenna elements included in the N receivers, the receiving signals including signals in which the M transmission signals have been reflected, transmitted, or scattered by the living body, N being an integer greater than or equal to two; and a circuit, wherein for each of M sets of the N reception signals corresponding to the M transmission signals transmitted by the M transmission antenna elements, the circuit performs calculation of a characteristic quantity based on the N reception signals included in the set, the characteristic quantity with a greater value indicating a waveform having a larger amplitude and higher regularity, identifies a first transmission antenna element corresponding to a first characteristic quantity having a greatest value among M characteristic quantities, each of which is the characteristic quantity obtained by the calculation, by comparing the M characteristic quantities with each other, and estimates the living body orientation to indicate a predetermined direction based on the first transmission antenna element identified.

According to this, a predetermined direction is determined to be a living body orientation, the predetermined direction being based on a transmission antenna element corresponding to the first characteristic quantity having the greatest value among the M characteristic quantities corresponding to the M transmission signals transmitted from the M transmission antenna elements arranged around the predetermined range. In this manner, the resolution and accuracy of an estimated living body orientation can be improved by arranging the transmission antenna elements and the receiving antenna elements around the predetermined range.

For instance, for each of the M sets of the N reception signals, the circuit may calculate the characteristic quantity from a second received waveform which is obtained by removing a direct current (DC) component of a first received waveform based on the N reception signals included in the set, from the first received waveform.

Thus, a DC component, which is a component unnecessary for identification of a living body, can be reduced in the reception signal, and living body identification can be efficiently performed.

For instance, the circuit may calculate a total of local maximum heights of the second received waveform as the characteristic quantity.

For instance, the circuit may calculate a variance of the second received waveform in a temporal direction as the characteristic quantity.

For instance, the circuit may calculate an integral value of a function over a predetermined frequency range as the characteristic quantity, the function being obtained by performing frequency domain transformation on the second received waveform.

For instance, the circuit may estimate the living body orientation to indicate a direction in which a maximum value of an approximate curve is attained, the approximate curve being obtained by performing approximation using an approximate function which has an upward convex curve, and indicates a relationship between a direction with respect to the predetermined range and the characteristic quantities, the approximate function being applied to: a first direction of the first transmission antenna element identified with respect to the predetermined range; the first characteristic quantity corresponding to the first transmission antenna element; two or more second directions of two or more second transmission antenna elements with respect to the predetermined range, the two or more second transmission antenna elements being arranged in a range within a predetermined distance from the first transmission antenna element among the M transmission antenna elements; and two or more characteristic quantities corresponding to the two or more second transmission antenna elements.

According to this, estimation of orientation can be made with further fine resolution by performing approximation with an approximate function using the first characteristic quantity having the greatest value, the two or more second characteristic quantities corresponding to the two or more second transmission antenna elements in the vicinity of the first transmission antenna element corresponding to the first characteristic quantity, and the first direction and the two or more second directions of the first transmission antenna element and the two or more second transmission antenna elements with respect to the predetermined range.

It should be noted that general or specific embodiments may be implemented as a system, a method, an integrated circuit, a computer program, a recording medium such as a computer readable CD-ROM, or any selective combination thereof.

Hereinafter, an embodiment of the present disclosure will be described in detail with reference to the drawings. It should be noted that the embodiment described below is a specific preferred example of the present disclosure. The numerical values, shapes, materials, components, arrangement positions and connection configurations of the components, steps, the order of the steps shown in the following embodiment each provide an example, and are not intended to limit the present disclosure. Also, those components in the following embodiment, which are not stated in the independent claim that defines the most generic concept of the present disclosure are described as arbitrary components constituting a more preferable embodiment. It should be noted that, in the present description and the drawings, components having substantially the same functional are labeled with the same symbol, and a redundant description is omitted.

Embodiment

FIG. 1 is a configuration diagram illustrating an example of an estimation device in an embodiment.

As illustrated in FIG. 1, estimation device 10 includes eight transceivers 20A to 20H, and circuit 40. Estimation device 10 transmits a transmission signal from transceivers 20A to 20H to predetermined range A1 including living body 100 such as a human, and receive reception signals by transceivers 20A to 20H, the reception signals including signals reflected, transmitted, or scattered by living body 100. Estimation device 10 estimates a living body orientation that is the direction in which the front side of living body 100 faces, by processing the reception signals received by transceivers 20A to 20H in circuit 40.

Eight transceivers 20A to 20H have antenna elements 30A to 30H, respectively. Transceivers 20A to 20H each transmit a transmission signal to predetermined range A1 using antenna elements 30A to 30H. Thus, antenna elements 30A to 30H emit specifically microwave as a transmission signal to living body 100 such as a human. Transceivers 20A to 20H may transmit an unmodulated transmission signal or may transmit a transmission signal on which modulation processing has been performed from antenna elements 30A to 30H. When modulation processing is performed, transceivers 20A to 20H may include a circuit for performing modulation processing. Antenna elements 30A to 30H are arranged surrounding predetermined range A1 at positions around predetermined range A1, in other words, at positions outwardly of predetermined range A1. For instance, antenna elements 30A to 30H are arranged at positions in eight different directions with respect to predetermined range A1. The eight different directions are, for instance, the directions defined by dividing 360° into eight equal parts around the position of the center of predetermined range A1. Eight transceivers 20A to 20H may be arranged to surround predetermined range A1 along with antenna elements 30A to 30H. Also, eight transceivers 20A to 20H may be arranged at positions different from the positions of antenna elements 30A to 30H.

It should be noted that predetermined range A1 is space in a predetermined range for estimating the orientation of living body 100 by estimation device 10.

Each of transceivers 20A to 20H receives reception signals for a predetermined period using respective antenna elements 30A to 30H, the reception signals including signals in which the transmission signals from transceivers 20A to 20H are reflected, transmitted, or scattered by living body 100. Each of transceivers 20A to 20H may convert a reception signal to a low frequency signal by performing frequency conversion. In addition, each of transceivers 20A to 20H may perform demodulation processing on a reception signal. Each of transceivers 20A to 20H outputs a signal to circuit 40, the signal being obtained by performing frequency conversion and/or demodulation processing. Each of transceivers 20A to 20H may include a circuit for processing a reception signal.

Although antenna elements 30A to 30H are configured to be used as both transmission antenna elements and receiving antenna elements, without being limited to this, the transmission antenna elements and the receiving antenna elements may be separately provided. Also, when the transmission antenna elements and the receiving antenna elements are separately provided, the number of transmission antenna elements and the number of receiving antenna elements may be different from each other. The number of transmission antenna elements is not limited to eight, and may be M (M is greater than or equal to three), for instance. The number of receiving antenna elements is not limited to eight, and may be N (N is greater than or equal to two), for instance. Although transceivers 20A to 20H have a configuration in which the transmitters which transmit a transmission signal and the receivers which receive a reception signal are integrated, the transmitters and the receivers may be separately provided.

Next, the functional configuration of circuit 40 will be described.

Figure 2:
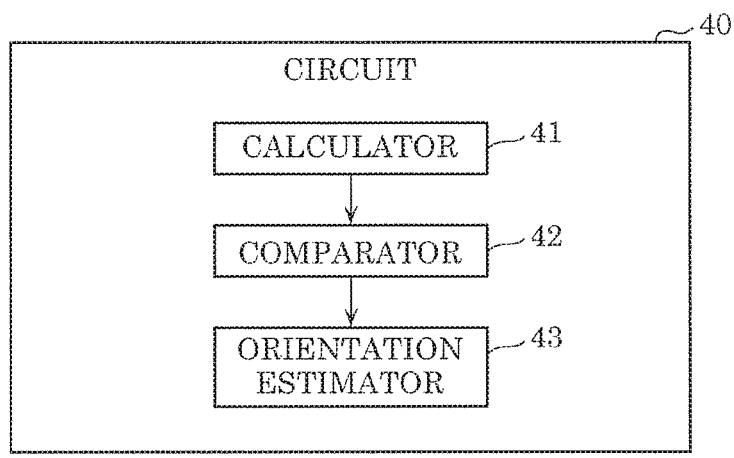
FIG. 2 is a block diagram illustrating an example of a functional configuration of a circuit in the embodiment.

FIG. 2 is a block diagram illustrating an example of a functional configuration of the circuit in the embodiment.

Circuit 40 has calculator 41, comparator 42, and orientation estimator 43 to perform various types of processing to operate estimation device 10. Circuit 40 includes, for instance, a processor that executes a control program, and a volatile storage area (main memory unit) which is used as a work area when the control program is executed. The volatile storage area is, for instance, a random access memory (RAM). Also, circuit 40 may be implemented by a dedicated circuit that performs various types of processing to operate estimation device 10. In other words, circuit 40 may be implemented as a circuit that performs software processing or implemented as a circuit that performs hardware processing.

Circuit 40 temporarily stores a signal obtained from each of transceivers 20A to 20H in a volatile storage area for a predetermined period. Circuit 40 may temporarily store the phase and the amplitude of the signal in a volatile storage area for a predetermined period. It should be noted that circuit 40 may have a nonvolatile storage area, and may temporarily store the signal in the nonvolatile storage area.

Hereinafter, the processing performed by calculator 41, comparator 42, and orientation estimator 43 included in circuit 40 will be sequentially described.

First, the calculation of a characteristic quantity performed by calculator 41 will be described.

Calculator 41 calculates transmission channel $H(t)$ of a reception signal using the reception signals stored in the storage area of circuit 40.

Here, transmission channel H(t) is represented by the following Expression 1, the H(t) being obtained when a multiple-input and multiple-output (MIMO) array antenna including M transmission antenna elements and N receiving antenna elements is arranged around living body 100.

$$H_n(t) = \begin{pmatrix} h_{11}(t) & \cdots & h_{1M_t}(t) \\ \vdots & \ddots & \vdots \\ h_{M_r1}(t) & \cdots & h_{M_rM_t}(t) \end{pmatrix} \quad \text{(Expression 1)}$$

In Expression 1, $h_{ij}$ indicates complex channel response from the jth transmitting antenna to the ith receiving antenna, and t indicates an observation time.

Next, calculator 41 calculates a DC removed channel in which a DC component is removed from the transmission channel, represented by the following Expression 2, of reception signals, the DC component being a component unnecessary for identification of living body 100. For each of M sets of N reception signals, calculator 41 removes the DC component from a first received waveform based on the N reception signals included in the set, thereby obtaining a second received waveform, in other words, a DC removal channel. Calculator 41 may store the calculated DC removed channel in the storage area of circuit 40.

Here, as indicated in the following Expression 3 and Expression 4, the DC removed channel c(t) of the reception signals is calculated by subtracting a DC component from each component of the transmission channel, the DC component being calculated by measurement time average of the component.

$$c(t) = \begin{pmatrix} c_{11}(t) & \cdots & c_{1M_t}(t) \\ \vdots & \ddots & \vdots \\ c_{M_r1}(t) & \cdots & c_{M_rM_t}(t) \end{pmatrix} \quad \text{(Expression 2)}$$

$$c_{ij}(t) = h_{ij}(t) - \frac{1}{N}\sum_{k=j}^{N} h_{ij}(k/F_S) \quad \text{(Expression 3)}$$

$$N = F_S \cdot T \quad \text{(Expression 4)}$$

Here, N indicates the number of snapshots, F, indicates a sampling frequency, and T indicates a measurement time.

It should be noted that a method of removing the DC component is not limited to the method represented by the right-hand side of Expression 3. For instance, a DC component may be removed by subtracting a transmission channel obtained in predetermined range A1 where no living body 100 is present.

Next, for each of the transmission antenna elements, calculator 41 calculates a characteristic quantity for a second received waveform corresponding to the transmission antenna based on N DC removed channels for each of antenna elements 30A to 30H, the characteristic quantity with a greater value indicating a waveform having a larger amplitude and higher regularity. The characteristic quantity calculated by calculator 41 is at least one of the total of the local maximum heights of a received waveform, the total of the absolute values of received waveforms, the variance of a received waveform, and an integral value of a function over a predetermined frequency range, the function being obtained by performing frequency domain transformation on a received waveform, for instance.

First, the case where the total of the local maximum heights of received waveforms is calculated as a characteristic quantity by calculator 41 will be described.

Figure 3:
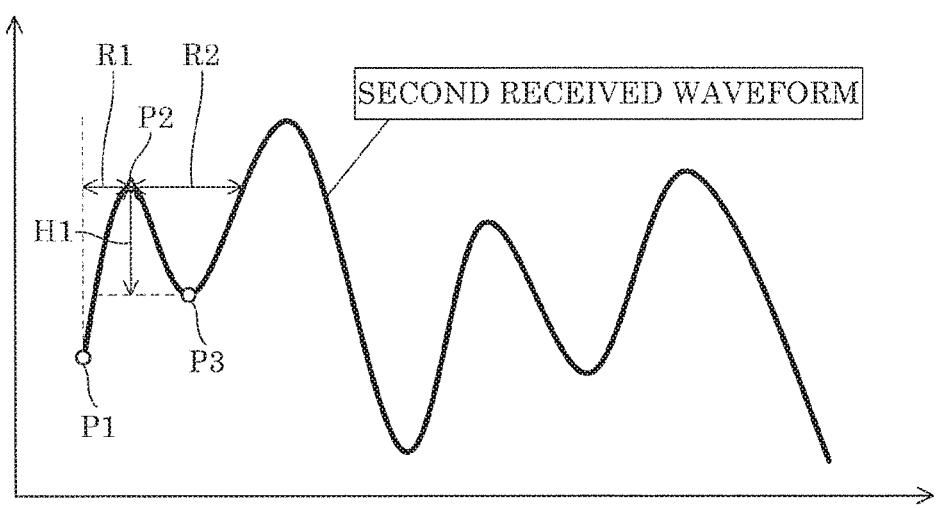
FIG. 3 is a graph for explaining a method of calculating the total of local maximum heights of a received waveform in the embodiment.

FIG. 3 is a graph for explaining a method of calculating the total of local maximum heights of a received waveform in the embodiment.

First, calculator 41 detects the local maximums of a target waveform, that is, the second received waveform. In FIG. 3, a local maximum is indicated by triangular point P2. Next, a line is drawn horizontally from point P2, the line is extended to the right and left until the line crosses the waveform or reaches the left end or the right end of the signal, and thus two intervals R1, R2 are identified on the right and left. Points P1, P2 are then identified, at which respective minimum values of the signal are attained within two intervals R1, R2. Let higher point P3 between points P1, P3 be a reference level, points P1, P3 giving respective minimum values within the two intervals, and the perpendicular distance from the reference level to each local maximum value is determined as a local maximum height. The local maximum height is calculated for all local maximum values of each received waveform of DC removed channels corresponding to each transmission antenna element, the total of the local maximum heights of all local maximum values is calculated, and thus characteristic quantity s(j) corresponding to the jth transmission antenna element is obtained. Here, in order to reduce the effect of disturbance of the received waveform caused by noise, calculator 41 may calculate a characteristic quantity by excluding a local maximum value from the total of local maximum heights, the local maximum value having a local maximum height lower than or equal to a threshold.

In addition, calculator 41 may calculate the total of the absolute values of N DC removed channels as characteristic quantity s(j). In this case, calculator 41 calculates characteristic quantity s(j) using the following Expression 5.

$$s(j) = \sum_{i=1}^{M_r} \sum_{k=0}^{N-1} \left| c_{ij}\left(\frac{k}{F_S}\right) \right| \quad \text{(Expression 5)}$$

In addition, calculator 41 may calculate the variance of the received waveforms of the DC removed channels of transmission channels as characteristic quantity s(j) for each of M transmission antenna elements. In this case, calculator 41 calculates characteristic quantity s(j) using the following Expression 6.

$$s(j) = \sum_{i=1}^{M_r} \text{var\_k}\left(c_{ij}\left(\frac{k}{F_S}\right)\right) \quad \text{(Expression 6)}$$

Here, var_k indicates the variance for variable k.

In addition, calculator 41 may calculate an integral value of function F over a predetermined frequency range as characteristic quantity s(j), the function being obtained by performing frequency domain transformation on each received waveform of the DC removed channels of transmission channels for each of the M transmission antenna elements. In this case, calculator 41 calculates characteristic quantity s(j) using the following Expression 7.

$$s(j) = \sum_{i=1}^{M_r} \int F(c_{ij}(t))$$ (Expression 7)

Calculator 41 calculates at least one of those three types of characteristic quantity, and outputs the calculated at least one characteristic quantity to comparator 42.

Comparator 42 compares M characteristic quantities with each other, which are obtained by calculation of calculator 41 and correspond to the M transmission antenna elements, thereby identifying the first transmission antenna element corresponding to the first characteristic quantity having the greatest value among the M characteristic quantities.

Orientation estimator 43 estimates a living body orientation to indicate a predetermined direction based on the first transmission antenna element identified by comparator 42, the living body orientation being the direction in which the front side of living body 100 faces. As a simplest example, orientation estimator 43 estimates a living body orientation to indicate the direction of location of the first transmission antenna element with respect to predetermined range A1, the first transmission antenna corresponding to the first characteristic quantity having the greatest value among the M characteristic quantities, and outputs the estimated orientation as an estimation result.

In addition, orientation estimator 43 may estimate a living body orientation to indicate a direction other than the direction of the location of a transmission antenna element with respect to predetermined range A1, for instance, the direction of the location between two transmission antenna elements with respect to predetermined range A1, using the following method. Specifically, orientation estimator 43 may estimate a living body orientation to indicate the direction in which a maximum value of an approximate curve is attained, the approximate curve being obtained by applying an approximate function to the first direction of the first transmission antenna element identified by comparator 42 with respect to predetermined range A1, the first characteristic quantity corresponding to the first transmission antenna element, two or more second directions of two or more second transmission antenna elements with respect to predetermined range A1, the two or more second transmission antenna elements being arranged in a range within a predetermined distance from the first transmission antenna element among the M transmission antenna elements, and two or more characteristic quantities corresponding to the two or more second transmission antenna elements. It should be noted that orientation estimator 43 may identify two transmission antenna elements arranged adjacent to the first transmission antenna element, that is, arranged on both sides of the first transmission antenna element, as the two or more second transmission antenna elements, for instance. Also, the approximate function is an approximate function that has an upward convex curve, and indicates a relationship between a direction with respect to predetermined range A1 and a characteristic quantity.

In this manner, since orientation estimator 43 estimates a living body orientation to indicate the direction in which an approximation function takes a maximum value, the resolution of the living body orientation can be improved without increasing the number of transmission antenna elements. In addition, orientation estimator 43 may store estimation results for a predetermined number of times, and determines an ultimate living body orientation to be the average value of the estimation results, thereby making it possible to reduce the effect of noise contained in received waveforms.

Figure 4:
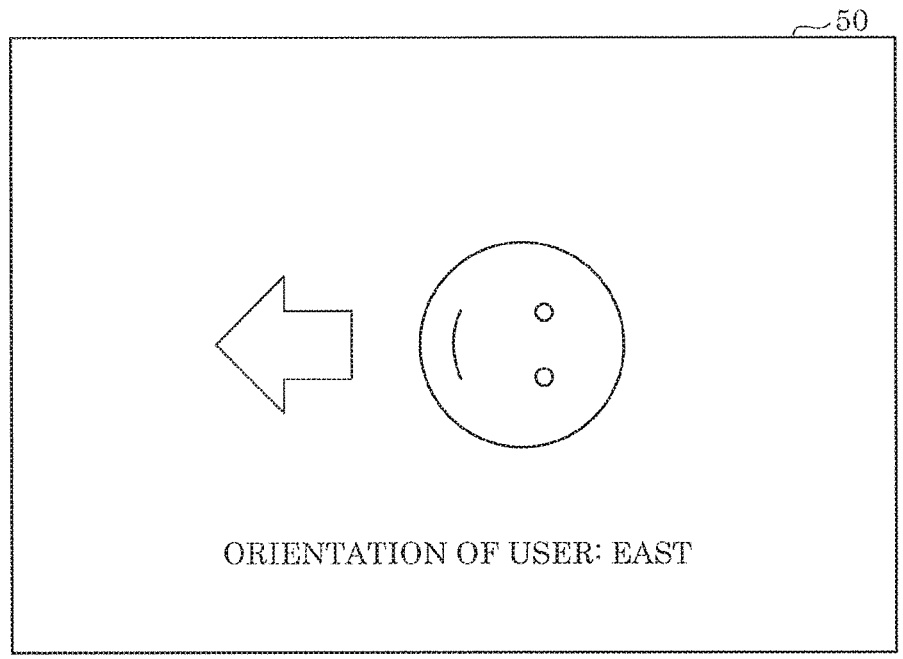
FIG. 4 is an example illustrating a result of estimation of an orientation of a living body in a room with the layout illustrated in FIG. 5.
Figure 5:
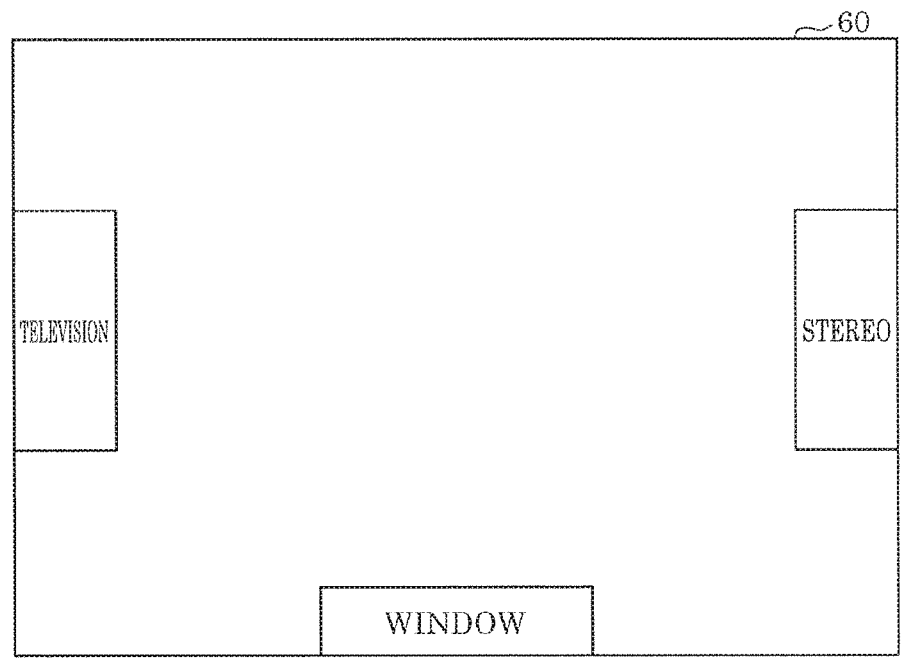
FIG. 5 is a diagram illustrating the room arrangement of the room which performed direction estimation of a living body.

It should be noted that estimation device 10 may further include display 50 that displays an estimated orientation of a living body. FIG. 4 is an example illustrating a result of estimation of an orientation of a living body in room 60 with the layout illustrated in FIG. 5. Room 60 is an example of predetermined range A1. As illustrated in this example, a method of displaying the orientation of a living body includes, for instance, a method of displaying the direction in which the front side of a living body faces, and a method of rotating an icon which indicates a living body.

Figure 6:
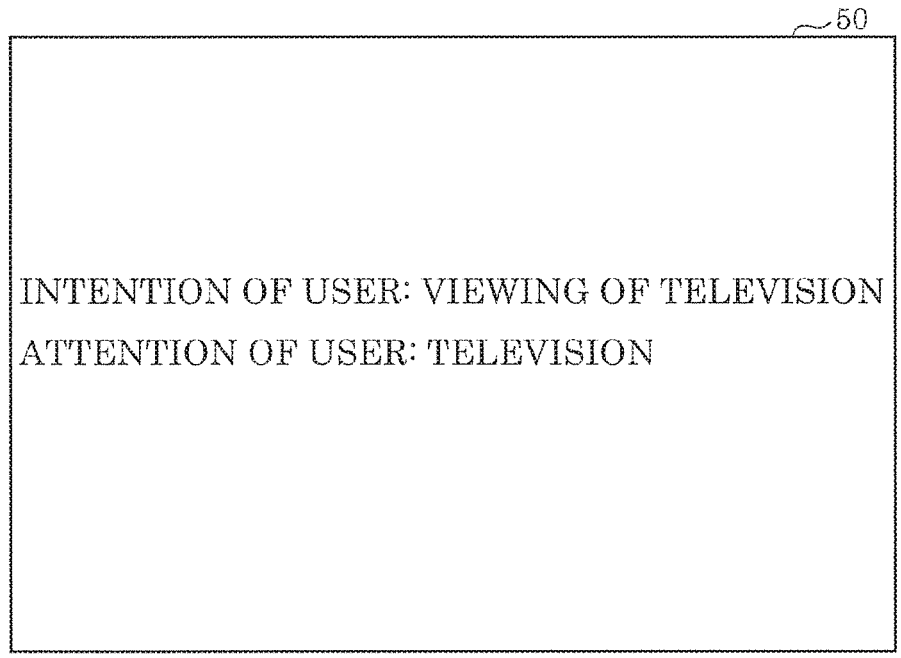
FIG. 6 is an example of display indicating a result of determination that attention is focused on a television when a living body faces the east side in the situation of FIG. 5.

Also, it is probable that the direction in which the front side of a living body faces is the direction in which the attention of the living body is focused or the intention of the living body is directed. For this reason, display 50 may display a target to which the attention of a living body is focused or the intention of a living body is directed instead of displaying the above-described orientation of a living body. FIG. 6 is an example of display indicating a result of determination that attention is focused on a television when a living body faces the east side in the situation of FIG. 5. In this case, estimation device 10 stores information by which each direction is associated with the type of an object disposed on the side in the direction in room 60, and displays the type of an object on display 50 as the target on which the attention of a living body is focused, the object corresponding to the direction in which the living body faces based on an estimated direction using the information.

Also, instead of displaying a target, on which the attention of a living body is focused, by display 50, remote control of a device or a lighting device may be performed. For instance, a lighting device in the direction, in which the attention of a living body is focused, may be turned on to provide a favorable field of view, or when multiple devices which allow an operation via voice input are present, a device to be operated by a user is determined so that only an appropriate device may be operated.

Figure 7:
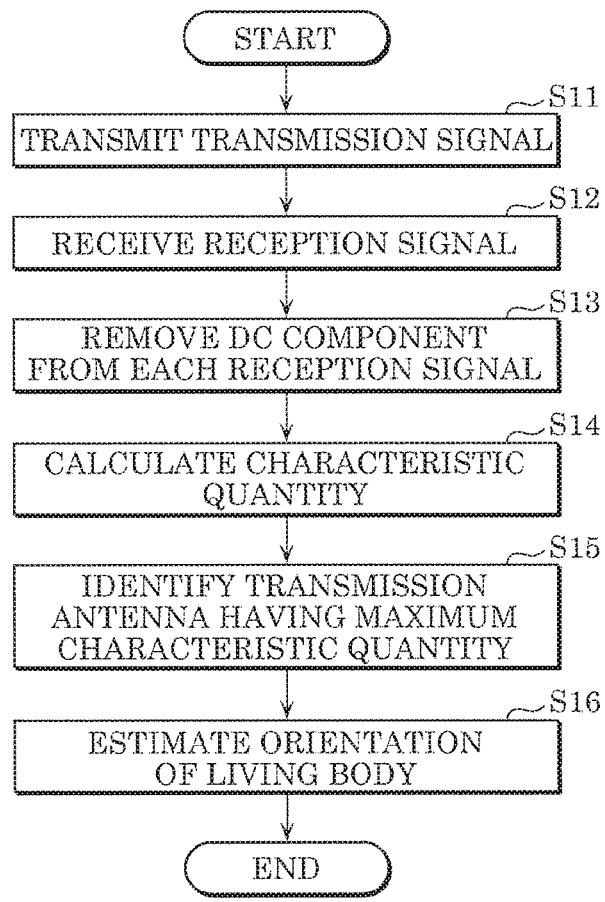
FIG. 7 is a flowchart illustrating an example of an operation of the estimation device in the embodiment.

FIG. 7 is a flowchart illustrating an example of an operation of estimation device 10 in the embodiment.

In estimation device 10, antenna elements 30A to 30H transmit a transmission signal to the predetermined range with living body 100 arranged in predetermined range A1 (S11). Specifically, in estimation device 10, eight transceivers 20A to 20H transmit eight transmission signals to predetermined range A1 including living body 100 using antenna elements 30A to 30H.

Subsequently, transceivers 20A to 20H receive reception signals for a predetermined period using eight antenna elements 30A to 30H, the reception signals including signals in which the transmission signals are reflected, transmitted, or scattered by living body 100 (S12).

Subsequently, calculator 41 removes the DC component of the first received waveform based on the reception signals received by transceivers 20A to 20H from the first received waveform (S13). Consequently, the DC component is removed from eight first received waveforms for each of eight sets of eight reception signals corresponding to eight transmission signals transmitted by eight transmission antenna elements, thus eight second received waveforms are obtained for each of the eight sets.

Calculator 41 calculates a characteristic quantity from each of the eight second received waveforms obtained for each of the eight sets (S14). Calculator 41 calculates at least one of the total of the local maximum heights of each received waveform, the total of the absolute values of received waveforms, the variance of each received waveform, and an integral value of a function over a predetermined frequency range as a characteristic quantity, the function being obtained by performing frequency domain transformation on each received waveform.

Comparator 42 compares eight characteristic quantities with each other, which are obtained by calculation of calculator 41, thereby identifying the first transmission antenna element corresponding to the first characteristic quantity having the greatest value among the eight characteristic quantities (S15).

Orientation estimator 43 estimates a living body orientation to indicate a predetermined direction based on the first transmission antenna element identified by the comparator (S16).

The inventors conducted an experiment to verify estimation device 10. In the experiment, eight transmitters and receivers corresponding to transceivers 20A to 20H were used. The eight transmitters and receivers are arranged around living body 100 as the center with a radius of 0.5 m and 45 degree interval in a circular form. Here, the transmission antenna element owned by each of the eight transmitters and receivers is one element, and provides a rectangular patch antenna. Also, the receiving antenna element owned by each of the eight transmitters and receivers is one element, and provides a rectangular patch antenna. Also, the height from the floor surface to the position at which the receiving antenna element is installed is 0.86 m. The transmission antenna element is arranged immediately above the receiving antenna element by one wavelength of microwave.

Figure 8:
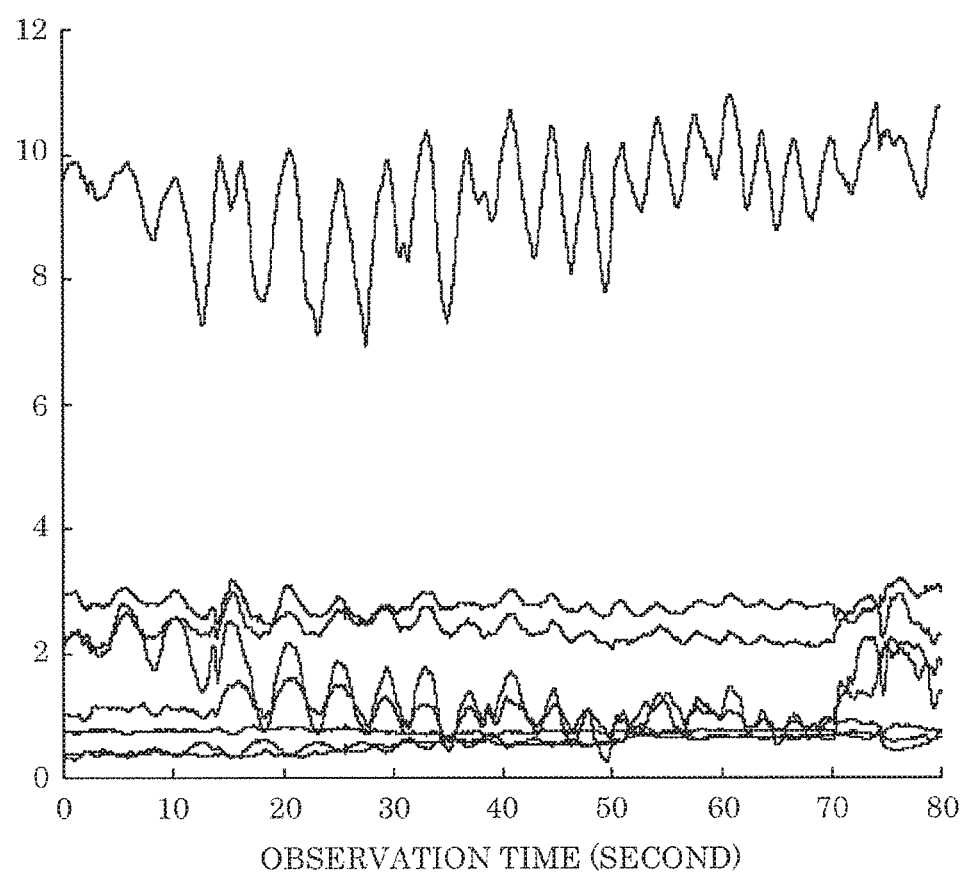
FIG. 8 is a graph illustrating the absolute value of each channel response of a transmission antenna in the front direction, the absolute value being observed in an experiment by the estimation device in the embodiment.
Figure 9:
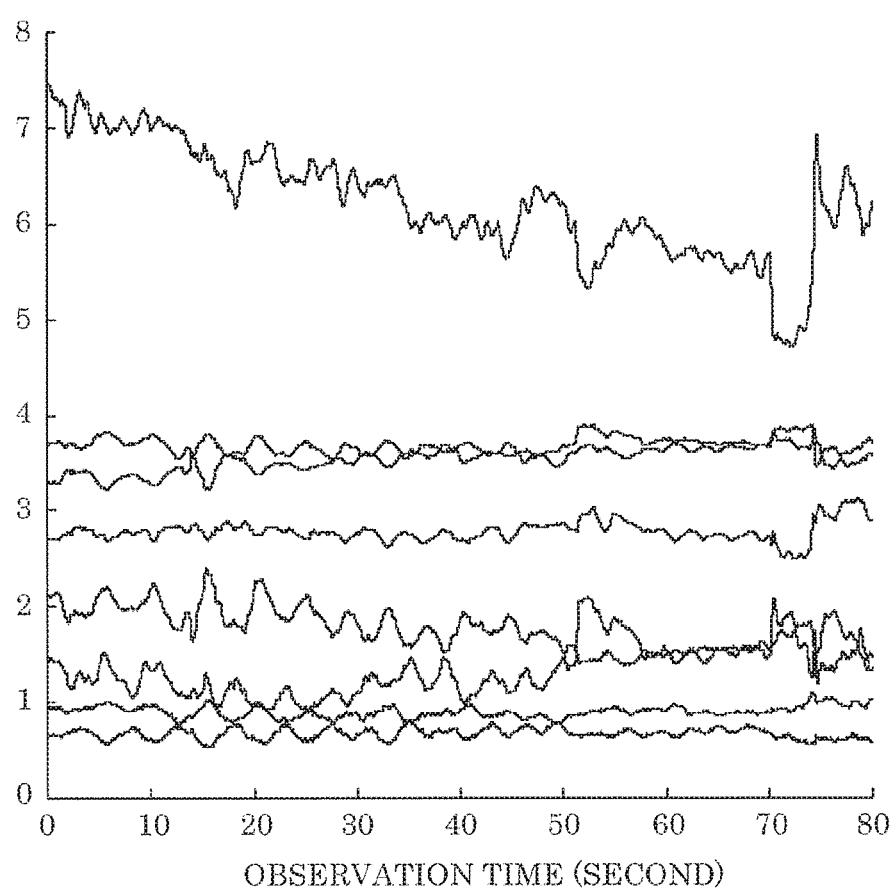
FIG. 9 is a graph illustrating the absolute value of each channel response of a transmission antenna in the side direction, the absolute value being observed in an experiment by the estimation device in the embodiment.
Figure 10:
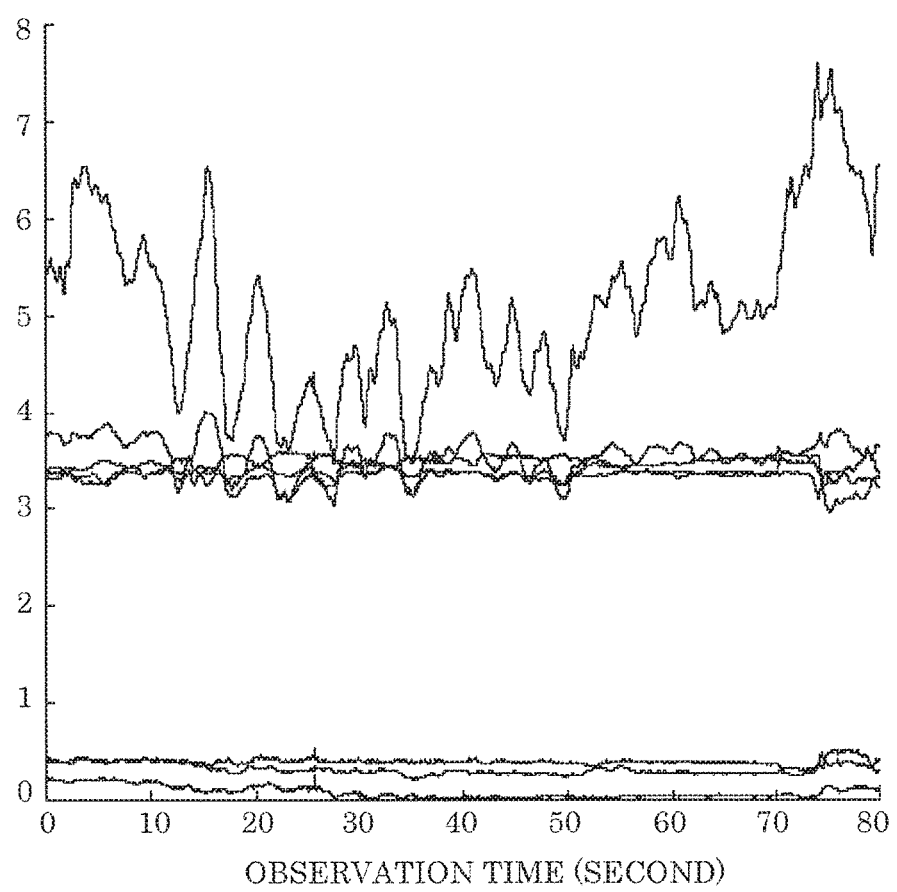
FIG. 10 is a graph illustrating the absolute value of each channel response of a transmission antenna in the rear direction, the absolute value being observed in an experiment by the estimation device in the embodiment.

Here, FIG. 8 illustrates the absolute value $|H_1(t)|$ of each channel response when a transmission signal is transmitted by the transmission antenna element located in the front direction of living body 100. FIG. 9 illustrates the absolute value $|H_3(t)|$ of each channel response when a transmission signal is transmitted by the transmission antenna element located in the side direction of living body 100. FIG. 10 illustrates the absolute value $|H_5(t)|$ of each channel response when a transmission signal is transmitted by the transmission antenna element located in the rear direction of living body 100.

It can be seen from comparison between FIGS. 8 to 10 that in only $|H_1(t)|$ for transmission from the front side, a waveform having a large amplitude and regularity is observed. FIG. 11 illustrates an example of a result of calculation of a characteristic quantity from the absolute value of each of these eight channel responses. In this case, the first transmission antenna element having the largest characteristic quantity is No. 2, and it is determined that the front side of a living body faces in the direction of 45°. In other words, comparator 42 identifies No. 2 transmission antenna element as the first transmission antenna element. Also, estimation of orientation can be made with further fine resolution by performing approximation with an approximate function using a transmission antenna in which a maximum value of characteristic quantity is attained, and the characteristic quantities of transmission antennas in the vicinity of the transmission antenna.

Figure 12:
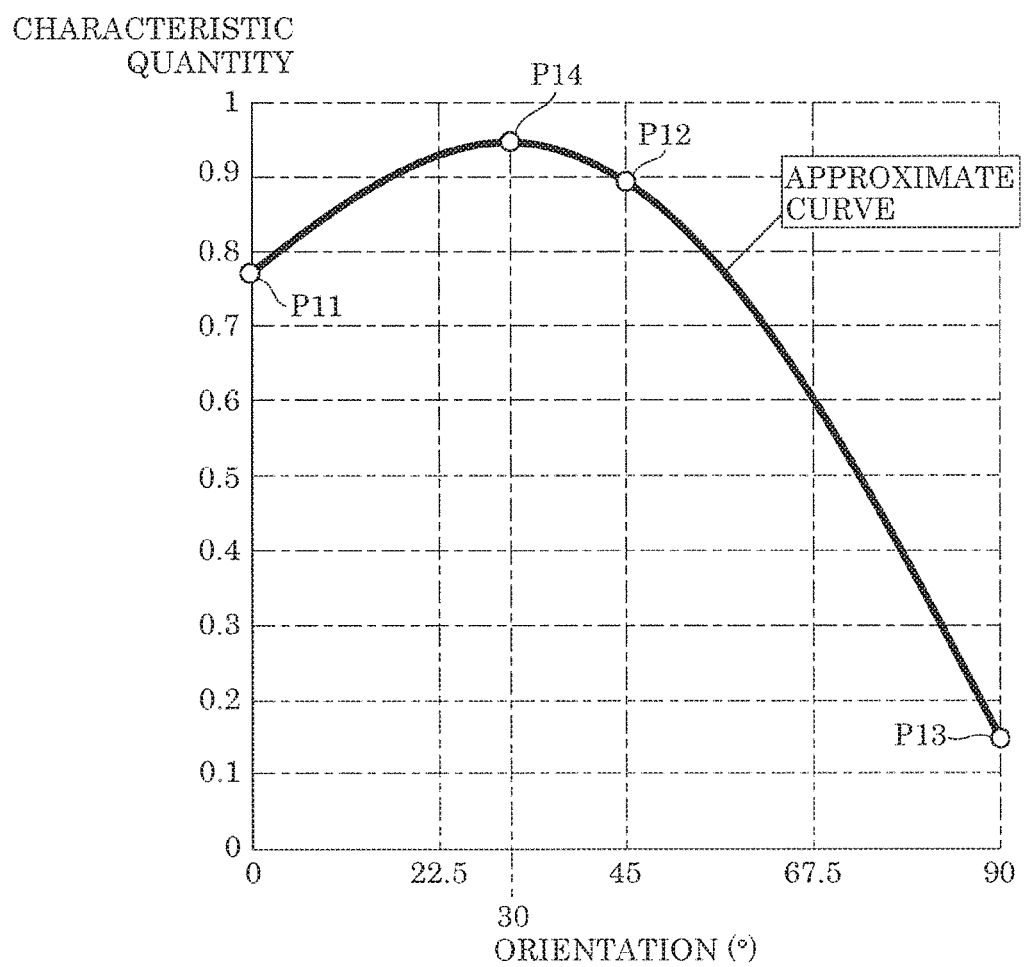
FIG. 12 is a graph illustrating an example in which the result of FIG. 11 is approximated by a quadratic function.

FIG. 12 is a graph illustrating an example in which the result of FIG. 11 is approximated by a quadratic function.

In this case, orientation estimator 43 retrieves the direction of 45° corresponding to the No. 2 transmission antenna element identified as the first transmission antenna element, and a characteristic quantity of 0.88. In addition, orientation estimator 43 retrieves the direction of 0° corresponding to the No. 1 transmission antenna element adjacent to the No. 2 transmission antenna element, and a characteristic quantity of 0.79. In addition, orientation estimator 43 retrieves the direction of 90° corresponding to the No. 3 transmission antenna element adjacent to the No. 2 transmission antenna element, and a characteristic quantity of 0.15. That is, orientation estimator 43 can estimate the direction corresponding to P14, for instance, 30°, as the living body orientation, the P14 indicating the local maximum of a curve obtained by approximating three points of P11 (0°, 0.79), P12 (45°, 0.88), and P13 (90°, 0.15) which are three combinations of ("direction with respect to transmission antenna element", "characteristic quantity") by a quadratic function.

(Effects)

With estimation device 10 according to the embodiment, a predetermined direction is determined to be a living body orientation, the predetermined direction being based on a transmission antenna element corresponding to the first characteristic quantity having the greatest value among the M characteristic quantities corresponding to the M transmission signals transmitted from the M transmission antenna elements. In this manner, the resolution and accuracy of an estimated living body orientation can be improved by arranging the transmission antenna elements and the receiving antenna elements around the predetermined range.

Also, estimation device 10 according to the embodiment estimates the living body orientation to indicate a predetermined direction obtained by performing approximation with an approximate function using the first characteristic quantity having the greatest value, the two or more second characteristic quantities corresponding to the two or more second transmission antenna elements in the vicinity of the first transmission antenna element corresponding to the first characteristic quantity, and the first direction and the two or more second directions of the first transmission antenna element and the two or more second transmission antenna elements with respect to the predetermined range. Thus, estimation of orientation can be made with further fine resolution.

In addition, estimation device 10 according to the embodiment can estimate the direction in which living body 100 such as a human faces using wireless signals such as microwave. In other words, estimation device 10 according to the embodiment can estimate the direction in which living body 100 such as a human faces without conducting image analysis on an image captured by a camera or the like, thus the living body orientation of an individual can be estimated with the privacy of the individual protected.

A device, in which the functions of each transmitter and each receiver of estimation device 10 according to the embodiment are switched, may be adopted as the estimation device.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to an estimation device that estimates a living body orientation utilizing wireless signals, and particularly to a household electrical appliance that performs control according to the orientation of a living body, and a system that detects and monitors sitting-up and roll-over of elderly.

What is claimed is:

1. An estimation device that estimates a living body orientation indicating a direction in which a front side of a living body faces, the estimation device comprising:
M transmitters that transmit M transmission signals to a predetermined range including the living body using M transmission antenna elements arranged to surround the predetermined range, M being an integer greater than or equal to three;
N receivers which are arranged to surround the predetermined range, and receive N reception signals for a predetermined period using respective receiving antenna elements included in the N receivers, the receiving signals including signals in which the M transmission signals have been reflected, transmitted, or scattered by the living body, N being an integer greater than or equal to two; and
a circuit,
wherein for each of M sets of the N reception signals corresponding to the M transmission signals transmitted by the M transmission antenna elements, the circuit performs calculation of a characteristic quantity based on the N reception signals included in the set, the characteristic quantity with a greater value indicating a waveform having a larger amplitude and higher regularity,
identifies a first transmission antenna element corresponding to a first characteristic quantity having a greatest value among M characteristic quantities, each of which is the characteristic quantity obtained by the calculation, by comparing the M characteristic quantities with each other, and
estimates the living body orientation to indicate a predetermined direction based on the first transmission antenna element identified.

2. The estimation device according to claim 1,
wherein for each of the M sets of the N reception signals, the circuit calculates the characteristic quantity from a second received waveform which is obtained by removing a direct current (DC) component of a first received waveform based on the N reception signals included in the set, from the first received waveform.

3. The estimation device according to claim 2,
wherein the circuit calculates a total of local maximum heights of the second received waveform as the characteristic quantity.

4. The estimation device according to claim 2,
wherein the circuit calculates a variance of the second received waveform in a temporal direction as the characteristic quantity.

5. The estimation device according to claim 2,
wherein the circuit calculates an integral value of a function over a predetermined frequency range as the characteristic quantity, the function being obtained by performing frequency domain transformation on the second received waveform.

6. The estimation device according to claim 1,
wherein the circuit estimates the living body orientation to indicate a direction in which a maximum value of an approximate curve is attained, the approximate curve being obtained by performing approximation using an approximate function which has an upward convex curve, and indicates a relationship between a direction with respect to the predetermined range and the characteristic quantities, the approximate function being applied to: a first direction of the first transmission antenna element identified with respect to the predetermined range; the first characteristic quantity corresponding to the first transmission antenna element; two or more second directions of two or more second transmission antenna elements with respect to the predetermined range, the two or more second transmission antenna elements being arranged in a range within a predetermined distance from the first transmission antenna element among the M transmission antenna elements; and two or more characteristic quantities corresponding to the two or more second transmission antenna elements.

7. An estimation method performed by an estimation device that estimates a living body orientation indicating a direction in which a front side of a living body faces,
the estimation device including M transmitters that transmit M transmission signals to a predetermined range including the living body using M transmission antenna elements arranged to surround the predetermined range, N receivers arranged to surround the predetermined range, and a circuit, M being an integer greater than or equal to three, N being an integer greater than or equal to two,
the estimation method comprising:
transmitting the M transmission signals to the predetermined range including the living body using the M transmission antenna elements;
receiving reception signals for a predetermined period using N receiving antenna element included in the N receivers, the receiving signals including signals in which the M transmission signals have been reflected, transmitted, or scattered by the living body;
for each of M sets of the N reception signals corresponding to the M transmission signals transmitted by the M transmission antenna elements, performing calculation of a characteristic quantity based on the N reception signals included in the set, the characteristic quantity with a greater value indicating a waveform having a larger amplitude and higher regularity;
identifying a first transmission antenna element corresponding to a first characteristic quantity having a greatest value among M characteristic quantities, each of which is the characteristic quantity obtained by the calculation, by comparing the M characteristic quantities with each other; and
estimating the living body orientation to indicate a predetermined direction based on the first transmission antenna element identified.

* * * * *